US009051153B2

United States Patent
Lichoulas et al.

(10) Patent No.: US 9,051,153 B2
(45) Date of Patent: Jun. 9, 2015

(54) STACKABLE FIBER MANAGEMENT SPOOL WITH RESEALABLE FIBER RETENTION ARMS

(75) Inventors: Ted Lichoulas, Simpsonville, SC (US); Eddie Kimbrell, Dacula, GA (US)

(73) Assignee: AFL Telecommunications LLC, Duncan, SC (US)

( * ) Notice: Subject to any disclaimer, the term of this patent is extended or adjusted under 35 U.S.C. 154(b) by 352 days.

(21) Appl. No.: 13/578,481

(22) PCT Filed: Feb. 11, 2011

(86) PCT No.: PCT/US2011/024524

§ 371 (c)(1), (2), (4) Date: Mar. 22, 2013

(87) PCT Pub. No.: WO2011/100545

PCT Pub. Date: Aug. 18, 2011

(65) Prior Publication Data

US 2013/0200193 A1 Aug. 8, 2013

Related U.S. Application Data

(60) Provisional application No. 61/303,744, filed on Feb. 12, 2010.

(51) Int. Cl.

| | |
|---|---|
| ***B65H 75/12*** | (2006.01) |
| ***B65H 75/28*** | (2006.01) |
| ***G02B 6/44*** | (2006.01) |

(52) U.S. Cl.

CPC .............. *B65H 75/12* (2013.01); *B65H 75/285* (2013.01); *B65H 2701/32* (2013.01); *B65H 2701/534* (2013.01); *G02B 6/4457* (2013.01)

(58) Field of Classification Search

CPC ........ B65H 75/08; B65H 75/12; B65H 75/14; B65H 75/285; B65H 2701/32; B65H 2701/534; G02B 6/4457

USPC ......... 242/170, 172, 402, 579, 580, 600, 605, 242/607.1, 614

See application file for complete search history.

(56) References Cited

U.S. PATENT DOCUMENTS

| | | | |
|---|---|---|---|
| 5,724,469 A | 3/1998 | Orlando | |
| 6,243,526 B1 | 6/2001 | Garibay et al. | |
| 6,398,149 B1 | 6/2002 | Hines et al. | |
| 7,059,895 B2 | 6/2006 | Murano | |
| 2009/0152390 A1 * | 6/2009 | Underbrink et al. | 242/432.6 |
| 2009/0220205 A1 | 9/2009 | Tsutsumi et al. | |

OTHER PUBLICATIONS

International Search Report of PCT/US2011/024524 dated Apr. 4, 2011.

* cited by examiner

*Primary Examiner* — William E Dondero

(74) *Attorney, Agent, or Firm* — Sughrue Mion, PLLC

(57) ABSTRACT

A spool including a barrel extending up from a bottom portion, a plurality of flanges extending from an outer circumferential surface of the barrel, a plurality of retaining arms extending up from an annular portion of the bottom portion, the annular portion extending radially away from the outer circumferential surface of the barrel, engagement mechanisms on at least one of the plurality of flanges and the plurality of retaining arms, wherein the engagement mechanisms cause the plurality of flanges and the plurality of retaining arms to become engaged, and a hinge on each of the plurality of retaining arms.

11 Claims, 10 Drawing Sheets

28
24
30
26
31
22
25
23
35
21

30
28
22
23
31
35
21

STACKABLE FIBER MANAGEMENT SPOOL WITH RESEALABLE FIBER RETENTION ARMS

CROSS-REFERENCE TO RELATED APPLICATIONS

This application claims the benefit of U.S. Provisional Patent Application No. 61/303,744 filed on Feb. 12, 2010 in the U.S. Patent and Trademark Office, the disclosure of which is incorporated herein in its entirety by reference.

BACKGROUND OF THE INVENTION

1. Field of the Invention

Methods and apparatuses consistent with aspects of the present invention relate to a spool for holding fiber/cables.

2. Background of the Invention

Most optical fiber management systems use integral or separately attached "clips" or "spools" to control the position of optical fiber or optical fiber cable within a fiber management shelf, enclosure, or closure. These fiber management accessories serve to better define how optical fiber or optical fiber cable is routed within a fiber management shelf, enclosure, or closure. "Clips" are easy to position within a fiber management shelf, enclosure, or closure but do not effectively limit the bend radius of optical fibers or optical fiber cables. In many conventional optical fibers and optical fiber cables, bending an optical fiber or optical fiber cable more than its bend limit increases signal loss. "Spools" ensure that the bend limits of optical fibers and optical fiber cables are not exceeded but are cumbersome when adding or removing lengths of optical fiber or optical fiber cable.

SUMMARY OF THE INVENTION

An aspect of the invention is to provide a fiber/cable management system including a fiber/cable management spool.

An embodiment of the invention is a spool that includes a barrel extending up from a bottom portion, a plurality of flanges extending from an outer circumferential surface of the barrel, a plurality of retaining arms extending up from an annular portion of the bottom portion, the annular portion extending radially away from the outer circumferential surface of the barrel, engagement mechanisms on at least one of the plurality of flanges and the plurality of retaining arms, wherein the engagement mechanisms cause the plurality of flanges and the plurality of retaining arms to become engaged, and a hinge on each of the plurality of retaining arms.

In another aspect of the invention, the plurality of retaining arms can pivot on the hinge.

In another aspect of the invention, the plurality of retaining arms can pivot up to approximately ninety degrees.

In another aspect of the invention, the hinge includes a V-shaped groove.

In another aspect of the invention, a plurality of recess portions are on a bottom surface of the annular portion of the bottom portion and the recess portions are configured such that a portion of a retaining arm can fit into the recesses.

Another embodiment of the invention is a spool system including first and second spools including: a barrel extending up from a bottom portion, a plurality of flanges extending from an outer circumferential surface of the barrel, a plurality of retaining arms extending up from an annular portion of the bottom portion, the annular portion extending radially away from the outer circumferential surface of the barrel, engagement mechanisms on at least one of the plurality of flanges and the plurality of retaining arms, wherein the engagement mechanisms cause the plurality of flanges and the plurality of retaining arms to become engaged, a hinge on each of the plurality of retaining arms, a plurality of recess portions on a bottom surface of the annular portion of the bottom portion, wherein a portion of a retaining arm of the first spool fits into one of the recess portions of the second spool.

In another aspect of the invention, an inner diameter of the bottom portion of the second spool is larger than the outer diameter the barrel of said first spool.

Another embodiment of the invention is a spool with a barrel extending down from a top portion, a ring extending from an outer circumferential surface of the barrel, a plurality of retaining arms extending down from an annular portion of the top portion, the annular portion extending radially away from the outer circumferential surface of the barrel, engagement mechanisms on at least one of the ring and the plurality of retaining arms, wherein the engagement mechanisms cause the ring and the plurality of retaining arms to become engaged, and a hinge on each of the plurality of retaining arms.

BRIEF DESCRIPTION OF THE DRAWINGS

The above and/or other aspects of the invention will become apparent and more readily appreciated from the following description of the exemplary embodiments, taken in conjunction with the accompanying drawings in which.

DETAILED DESCRIPTION OF THE EXEMPLARY EMBODIMENTS

Hereinafter the non-limiting exemplary embodiments of the present invention will be described in detail with reference to the accompanying drawings.

This invention is related to U.S. Provisional Application 61/242,001 filed Sep. 14, 2009, PCT Application No. PCT/US2010/048690 filed Sep. 14, 2010 and U.S. application Ser. No. 13/056,052 filed Jan. 26, 2011, the contents of each are incorporated herein by reference.

Figure 1:
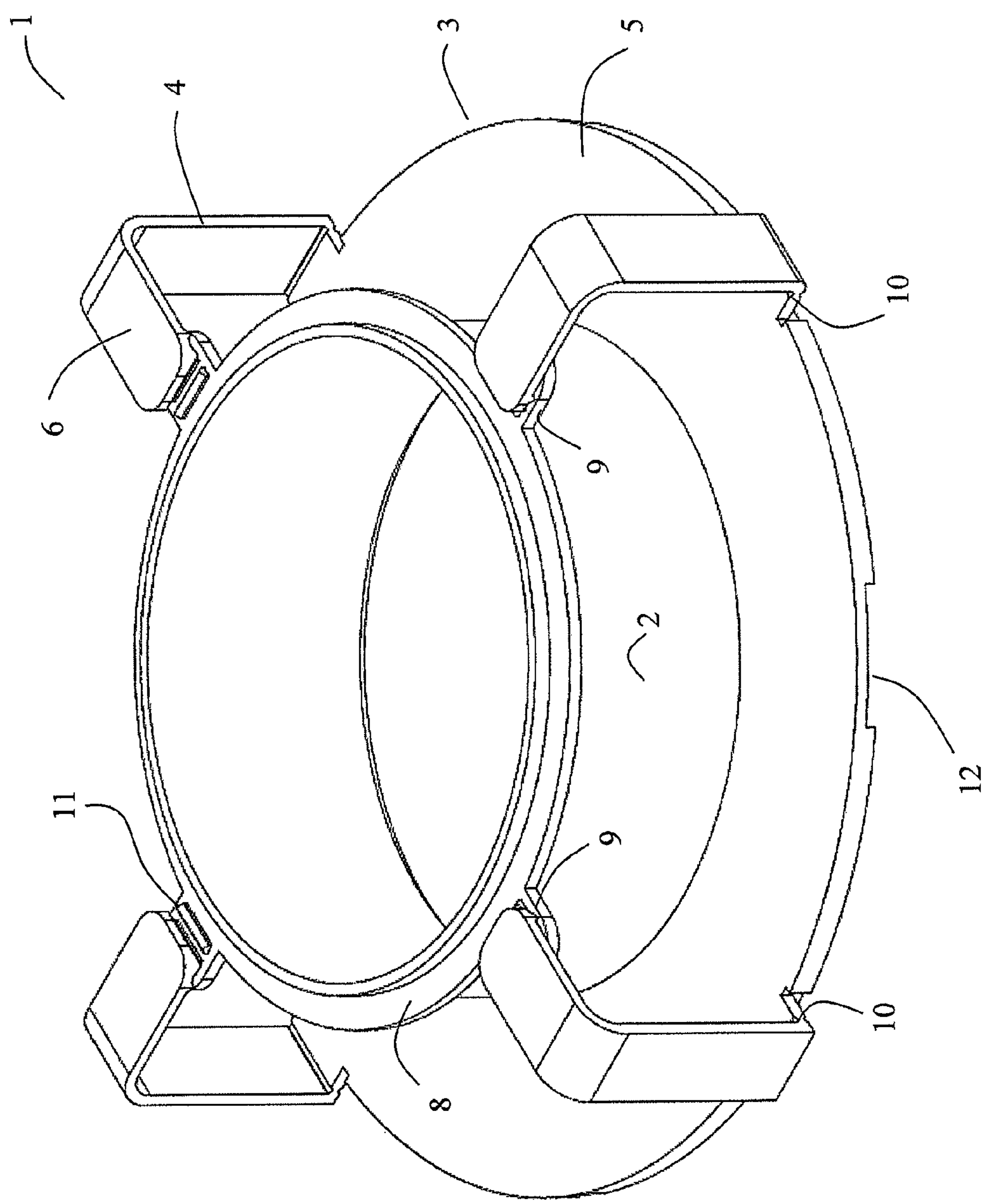
FIG. 1 is a perspective view showing a spool according to an exemplary embodiment.
Figure 2:
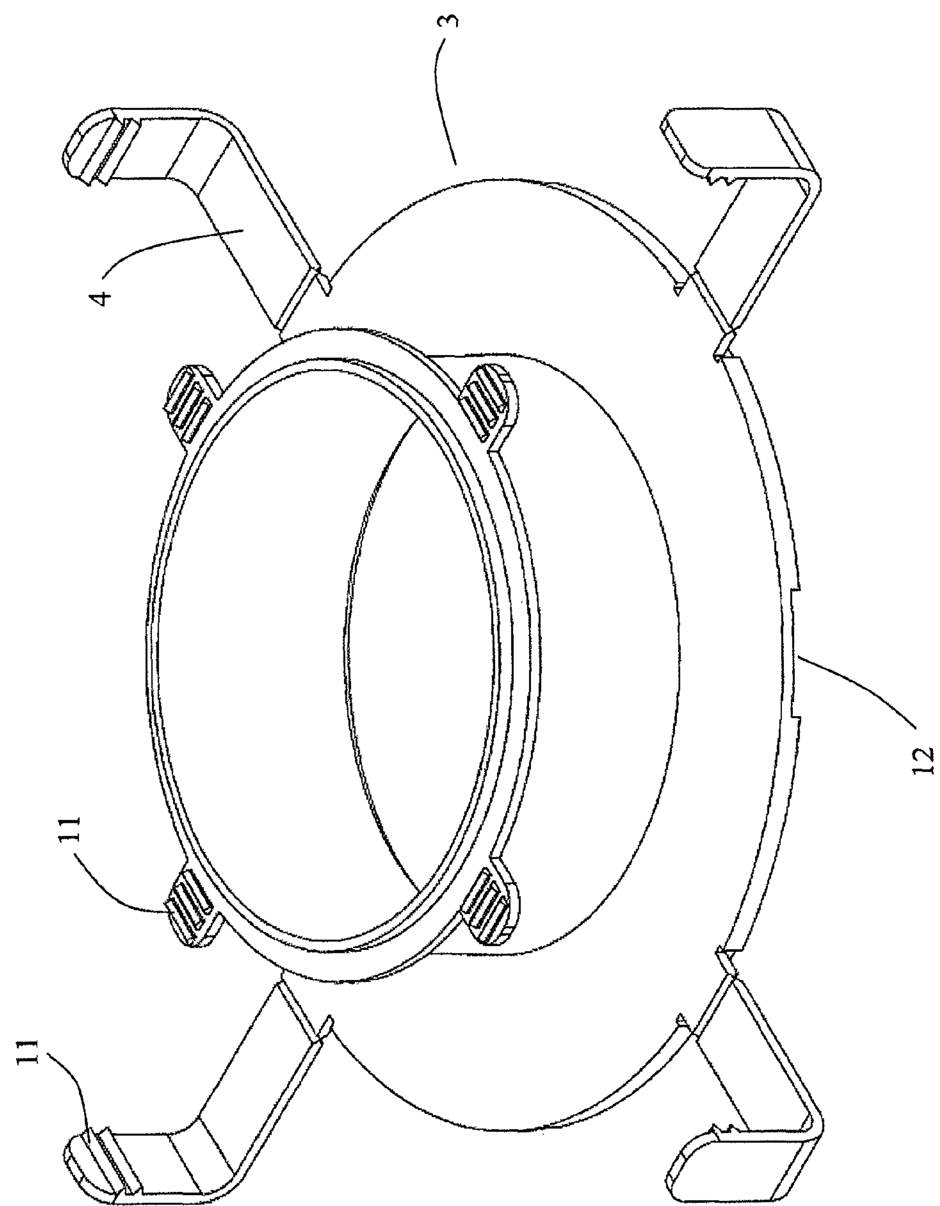
FIG. 2 is another perspective view showing a spool according to an exemplary embodiment.
Figure 3:
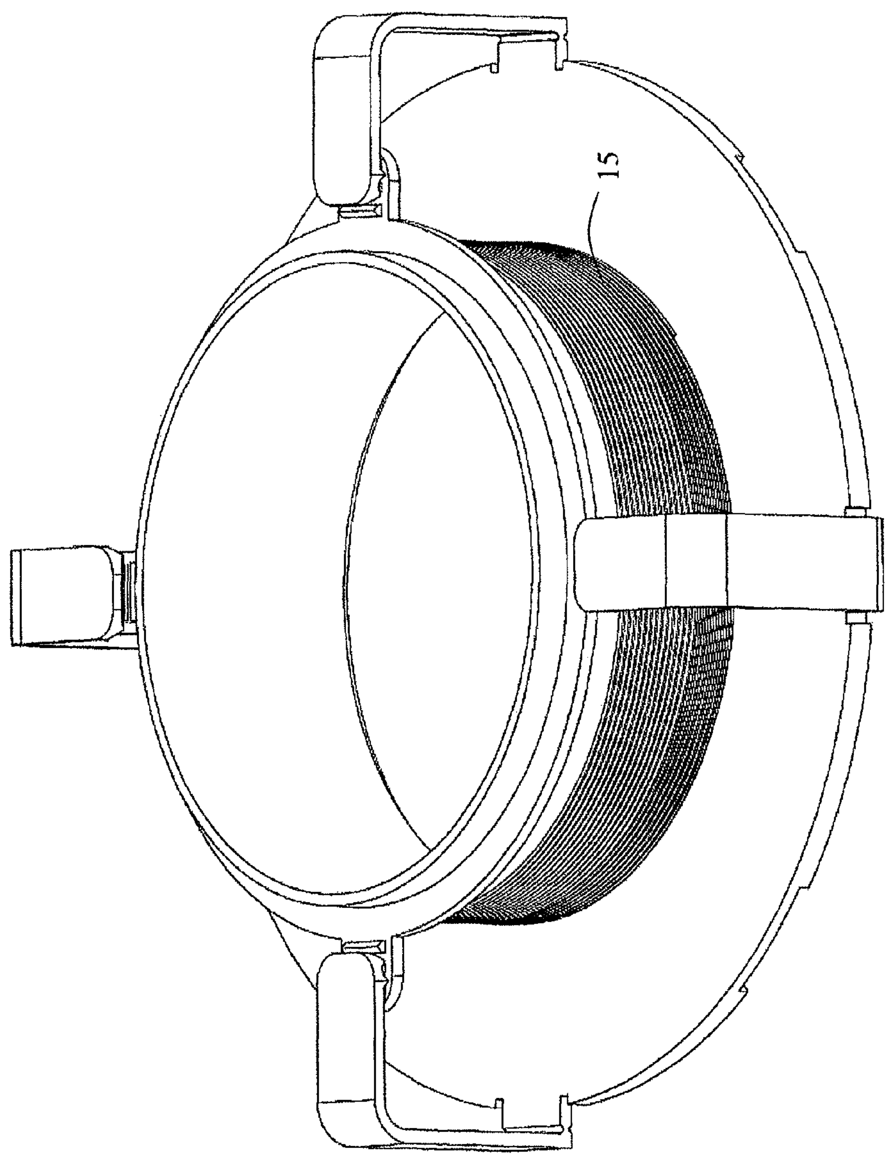
FIG. 3 is a perspective view showing a spool according to an exemplary embodiment with fiber/cable wrapped around the spool.
Figure 4:
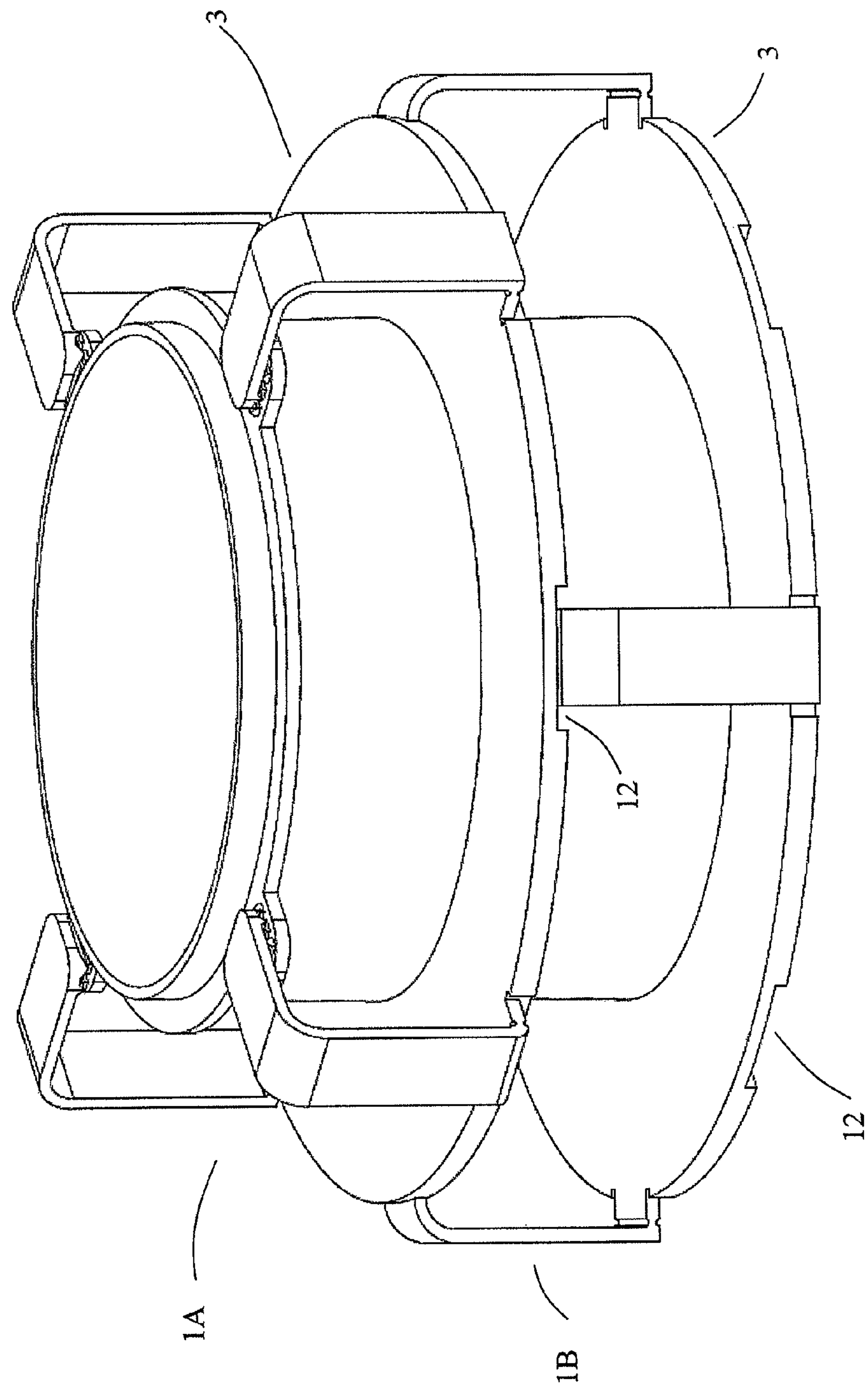
FIG. 4 is a perspective view showing two spools according to an exemplary embodiment stacked together.

An exemplary embodiment of a fiber/cable management spool 1 is shown in FIGS. 1-5. Spool 1 may be configured to hold and retain fiber/cables 15, such as shown in FIG. 3; however, the spool could also be used to hold non-fiber cables or wires. Spool 1 includes various components for holding fiber/cable. Specifically, spool 1 includes a cylindrical shaped barrel 2 extending away from a bottom portion 3. While barrel 2 is shown as a cylinder, any rounded shape that can ensure that bend limits are not exceeded would be acceptable. Spool 1 also includes an annular portion 5 that is provided around the periphery of the bottom of the barrel 2. A plurality of retaining arms 4 extend upward from an outer peripheral portion of the annular portion 5. These retaining arms 4 include inward extensions 6 that are provided at the top of the retaining arms 4. The inward extensions 6 extend inward toward the barrel 2. Below the top portion 7 of barrel 2 is a flange ring 8 that extends outwardly away from barrel 2. A plurality of flanges 9 extend outwardly away from flange ring 8. Barrel 2, retaining arms 4, annular portion 5, and flange ring 8 define a storage area of the spool 1.

A hinge 10 is formed where the retaining arms 4 are connected to the annular portion 5. Hinge 10 can be a "living hinge," such as a V-shaped groove. However, any type of hinge that will allow the fiber retaining arms 4 to bend or pivot so that fiber/cable can be removed from spool 1 would be acceptable. FIG. 2 shows retaining arms 4 bent or pivoted at approximately ninety degrees. However, retaining arms 4 do not have to pivot to ninety degrees. They only need to pivot enough so that the fiber can be removed from the spool 1.

Inward extensions 6 of fiber retaining arms 4 and/or flanges 9 contain engagement structures 11, such as teeth or protrusions, that enable the retaining arms 4 and flanges 9 to remain engaged to each other. Other conventional engagement structures that would allow the retaining arms 4 to engage and disengage with the flanges 9 could also be used. Retaining arms 4 and/or flanges 9 are pliant enough so that they can also be disengaged from each other. This engagement arrangement and hinge 10 allows fiber/cable to be quickly added or removed from spool 1, lowering installation and maintenance time compared to, conventional fiber management spools.

Spool 1 may be attached to a structure, such as a wall or cabinet, by means of adhesives, Velcro, or other conventional means.

Figure 5:
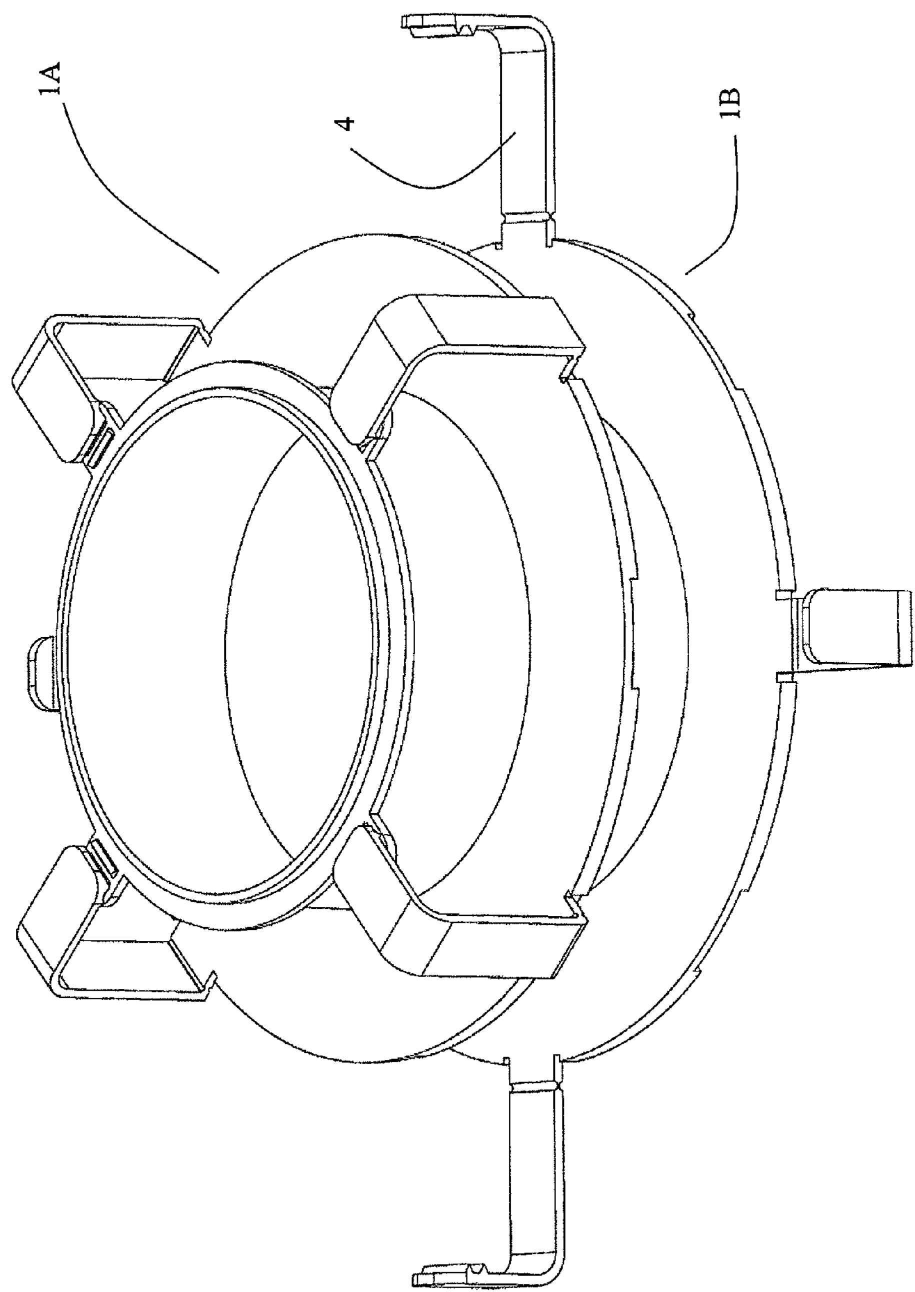
FIG. 5 is a perspective view showing two spools according to an exemplary embodiment stacked together.
Figure 6:
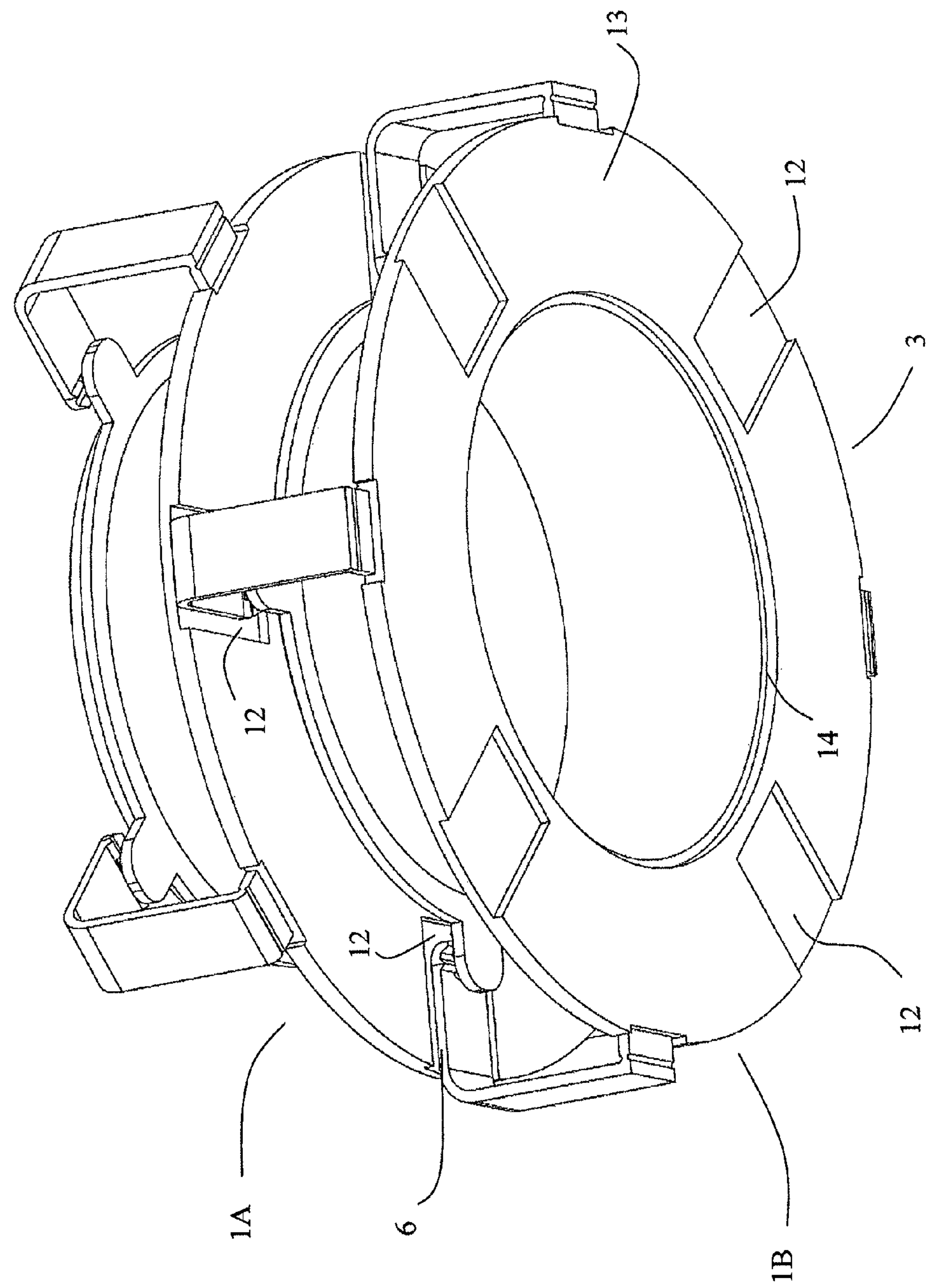
FIG. 6 is a perspective view showing two spools according to an exemplary embodiment stacked together.

Spool 1 may also be configured such that two or more spools may be stacked together. For example, the bottom side 13 of bottom portion 3 may contain a plurality of recess portions 12. Recess portions 12 are spaced apart so that inward extensions 6 from a bottom spool 1B will fit into the recess portions of a top spool 1A. See, for example, FIG. 6. In addition, as shown in FIG. 5, retaining arms 4 may be made pliant enough so that the arms can be bent or pivoted even if two or more spools are stacked together.

Figure 7:
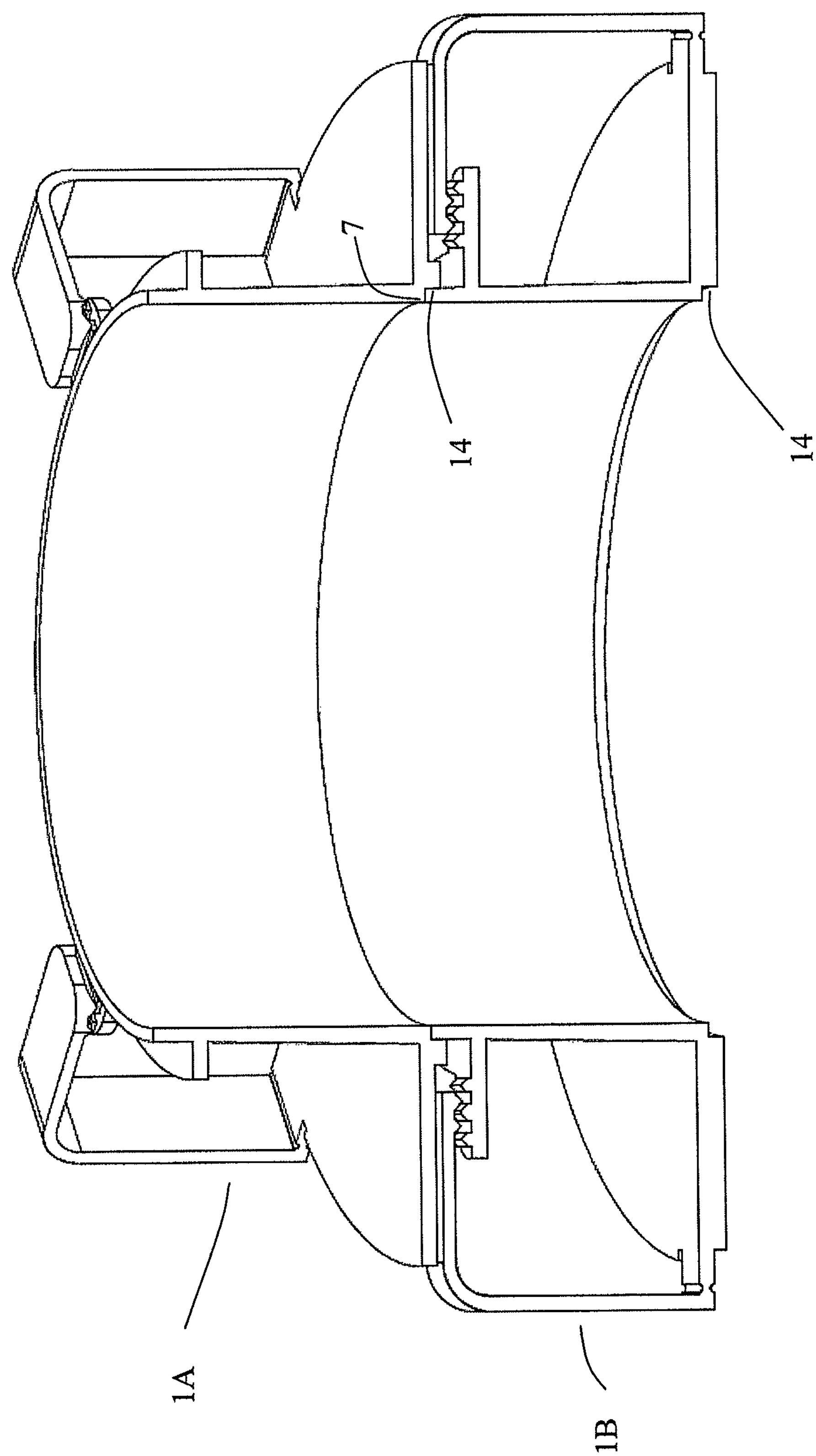
FIG. 7 is a perspective cross-sectional view showing two spools according to an exemplary embodiment stacked together.

In addition, in another embodiment, the inner diameter 14 of the bottom portion 3 may be slightly larger than the outer diameter of barrel 2, which would allow the top spool 1A to nest on the top portion 7 of barrel 2. See FIGS. 6 and 7. By sizing the outer diameter 14 to be slightly larger that the outer diameter of barrel 2 at the top portion 7, a friction-fit can be obtained, thereby keeping the two spools connected to each other. In addition, the two spools could be connected by adhesives, Velcro or other conventional means.

Figure 8:
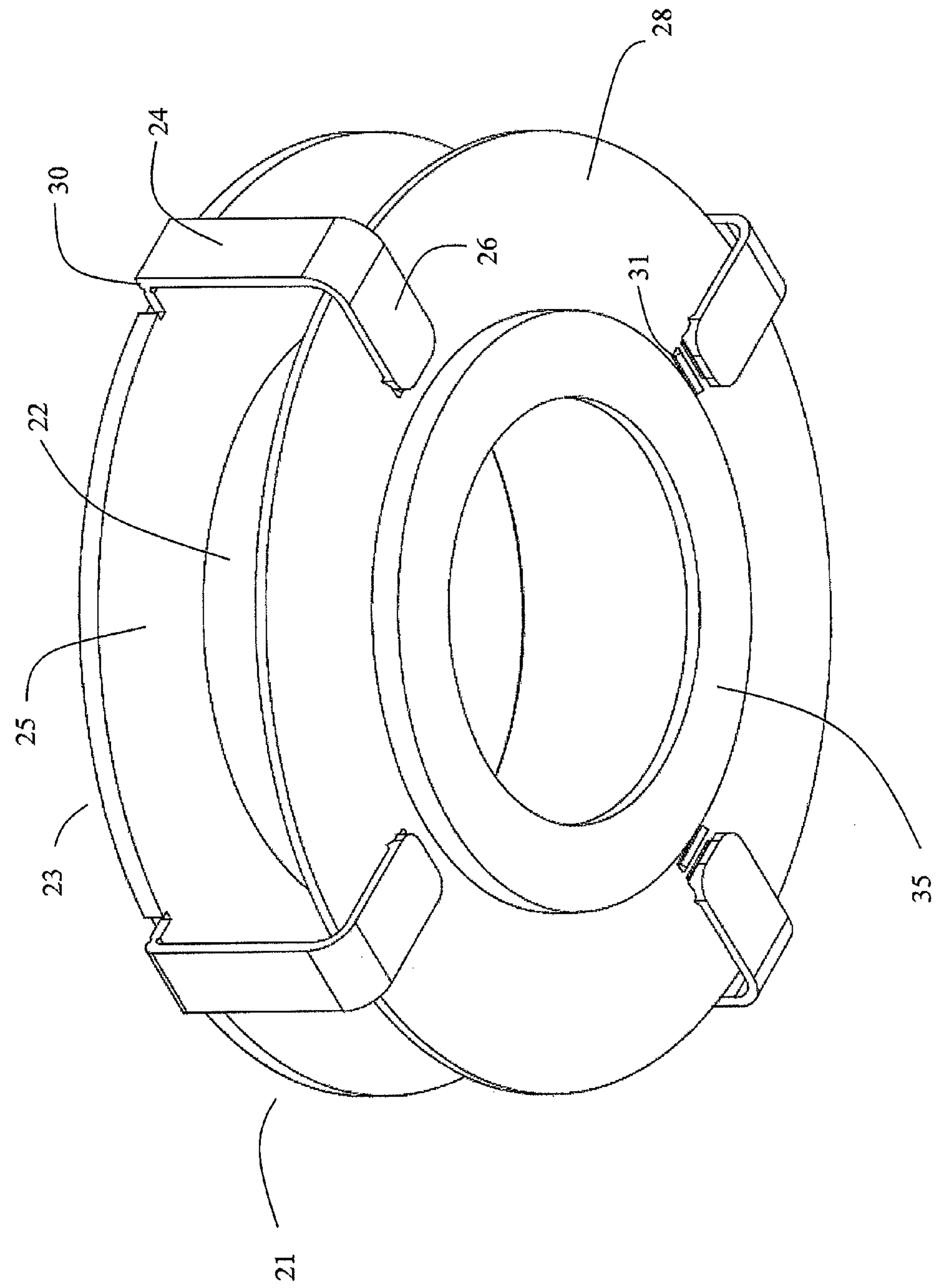
FIG. 8 is a perspective view showing a spool according to a second exemplary embodiment.
Figure 9:
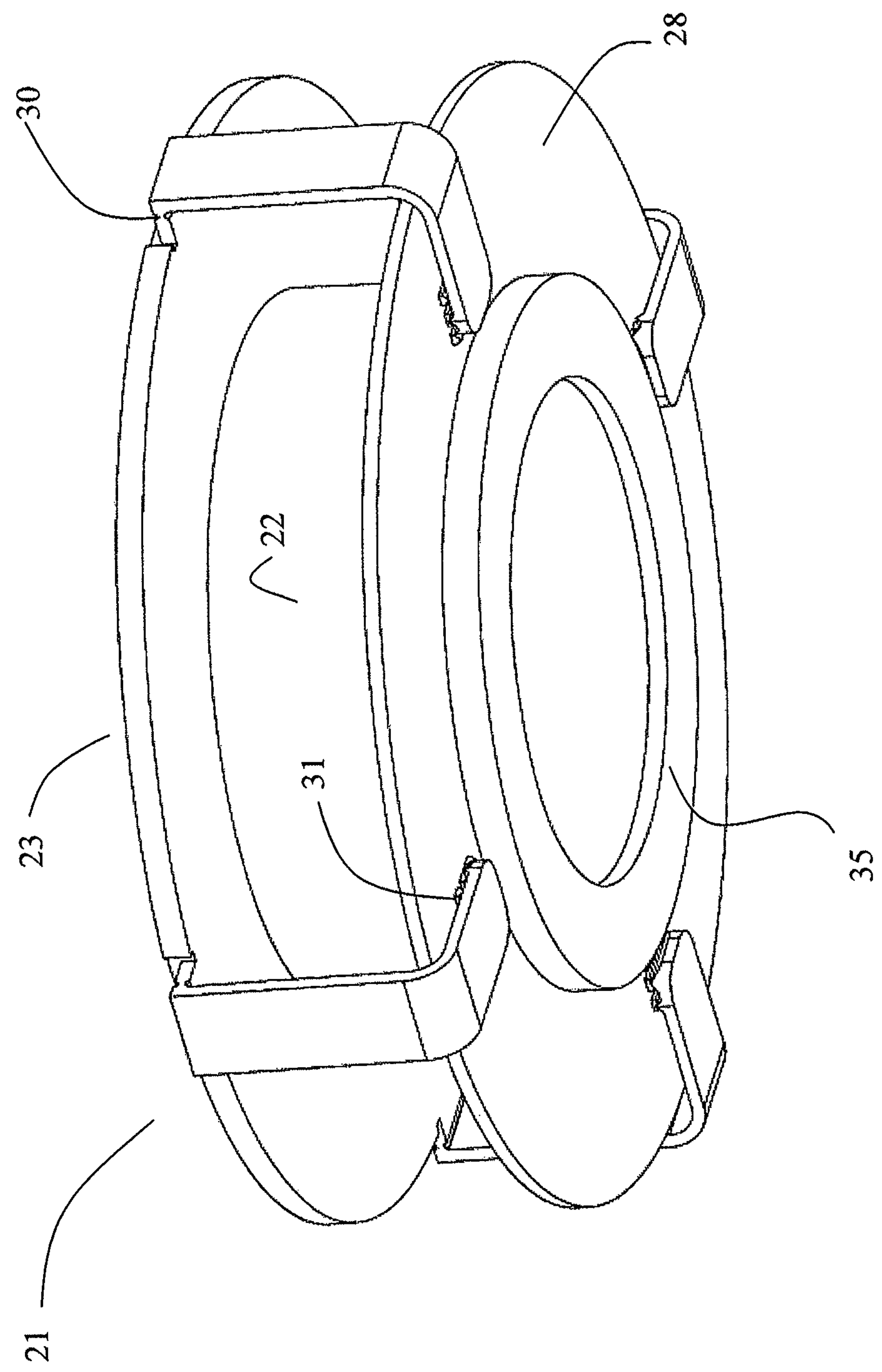
FIG. 9 is another perspective view showing a spool according to the second exemplary embodiment.
Figure 10:
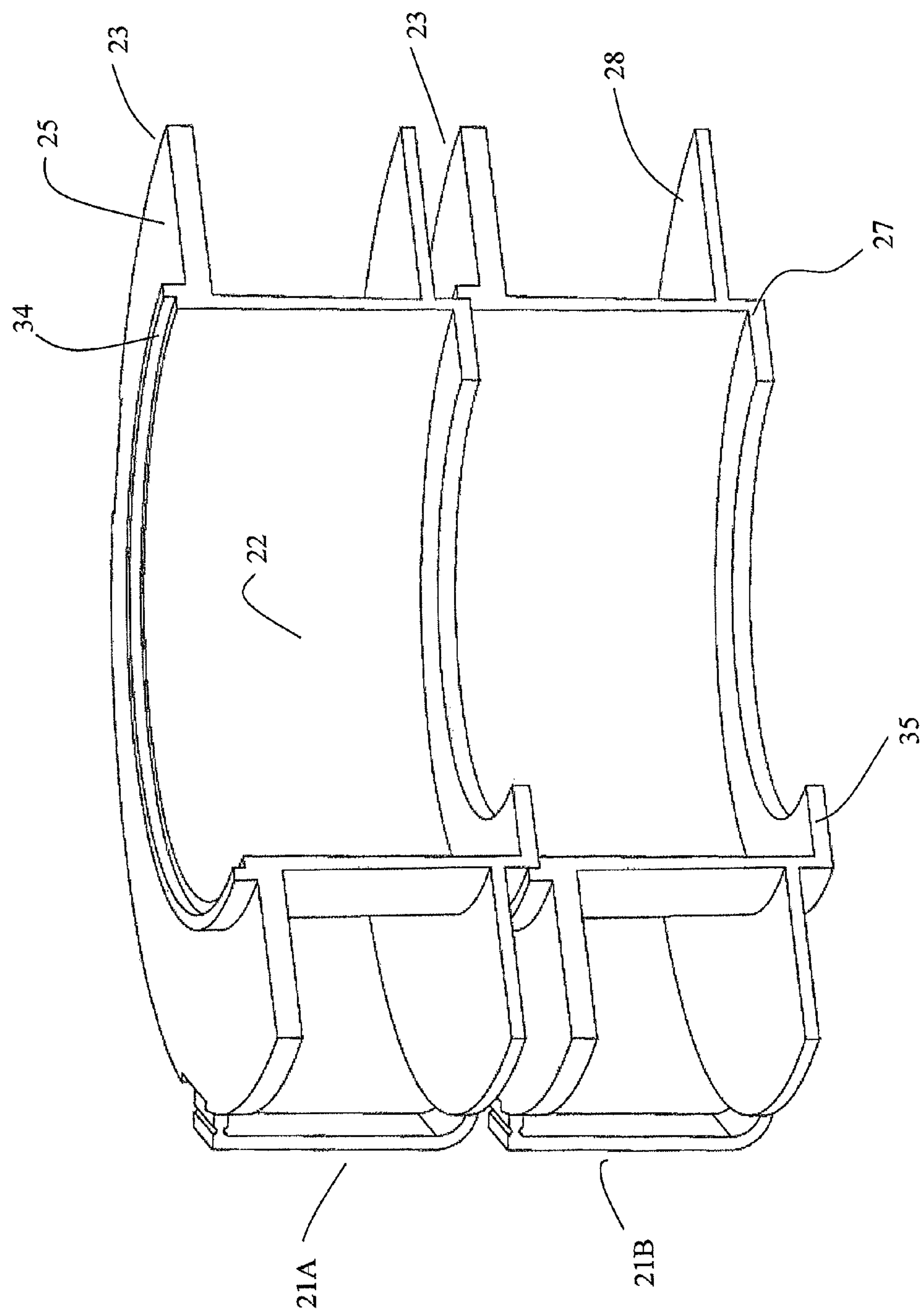
FIG. 10 is a perspective view showing two spools according to the second exemplary embodiment stacked together.

Another exemplary embodiment of fiber/cable management spool 21 is shown in FIGS. 8-10. Spool 21 may be configured to hold and retain fiber/cables; however, the spool could also be used to hold non-fiber cables or wires. Spool 21 includes various components for holding fiber/cable. Specifically, spool 21 includes a cylindrical shaped barrel 22 extending away from a top portion 23. While barrel 22 is shown as a cylinder, any rounded shape that can ensure that bend limits are not exceeded would be acceptable. Spool 21 also includes an annular portion 25 that is provided around the periphery of the top of the barrel 22. A plurality of retaining arms 24 extend downward from an outer peripheral portion of the annular portion 25. These retaining arms 24 include inward extensions 26 that are provided at the bottom of the retaining arms 24. The inward extensions 26 extend inward toward the barrel 22. Near the bottom portion 27 of barrel 22 is a ring 28 that extends outwardly away from barrel 22. Ring 28 is placed sufficiently above the bottom portion 27 so that there is space for inward extensions 26 when two or more spools 21 are stacked together. Alternatively, recesses similar to recesses 12 could be formed in the bottom of ring 28 to allow for inward extensions 26. Barrel 22, retaining arms 24, annular portion 25, and ring 28 define a storage area of the spool 21. Also at the bottom of barrel 22 is a ring 35 extending inwardly from barrel 22. Ring 35 can be used as a surface for attaching spool 21 to a structure, such as a wall or cabinet, by means of adhesives, Velcro, or other conventional means A hinge 30 is formed where the retaining arms 24 are connected to the annular portion 25. Hinge 30 can be a "living hinge," such as a V-shaped groove. However, any type of hinge that will allow the fiber retaining arms 24 to bend or pivot so that fiber/cable can be removed from spool 21 would be acceptable. The retaining arms 24 can bend or pivot in a similar manner as retaining arms 4 shown in FIG. 2.

Inward extensions 26 of fiber retaining arms 24 and/or ring 28 contain engagement structures 31, such as teeth or protrusions, that enable the retaining arms 24 and ring 28 to remain engaged to each other. Other conventional engagement structures that would allow the retaining arms 4 to engage and disengage with the flanges 9 could also be used. Retaining arms 24 and/or ring 28 are pliant enough so that they can also be disengaged from each other. This engagement arrangement and hinge 30 allows fiber/cable to be quickly added or removed from spool 21, lowering installation and maintenance time compared to, conventional fiber management spools.

Spool 21 may also be configured such that two or more spools may be stacked together. See, for example, spools 21A and 21B in FIG. 10.

In addition, in another embodiment, the inner diameter 34 of the top portion 23 may be slightly larger than the outer diameter of barrel 22, which would allow the top spool 21A to nest on the bottom spool. See FIG. 10. By sizing the outer diameter 34 to be slightly larger that the outer diameter of barrel 22, a friction-fit can be obtained, thereby keeping the two spools connected to each other. In addition, the two spools could be connected by adhesives, Velcro or other conventional means.

Although a few exemplary embodiments of the present invention have been shown and described, it would be appreciated by those skilled in the art that changes may be made in this embodiment without departing from the principles and spirit of the invention, the scope of which is defined in the claims and their equivalents. Additionally, while the spools are described above for use with fiber optic cables, the invention is not so limited. Rather, the spools may be used with wires or any other type of flexible cable.

What is claimed is:

1. A spool comprising:

a barrel extending down from a top portion;

a ring extending from an outer circumferential surface of said barrel;

a plurality of retaining arms extending down from an annular portion of said top portion, the annular portion extending radially away from said outer circumferential surface of said barrel;

engagement mechanisms on at least one of said ring and said plurality of retaining arms, wherein said engagement mechanisms cause said ring and said plurality of retaining arms to become engaged; and a hinge on each of said plurality of retaining arms.

2. The spool of claim 1, wherein said plurality of retaining arms can pivot on said hinge.

3. The spool of claim 2, wherein said plurality of retaining arms can pivot up to approximately ninety degrees.

4. The spool of claim 1, wherein said hinge comprises a V-shaped groove.

5. A spool comprising:

a barrel extending up from a bottom portion;

a ring extending from an outer circumferential surface of said barrel;

a plurality of flanges extending from said ring;

a plurality of retaining arms extending up from an annular portion of said bottom portion, the annular portion extending radially away from said outer circumferential surface of said barrel, wherein the plurality of retaining arms and the plurality of flanges are disposed at corresponding radial positions of said barrel;

engagement mechanisms on at least one of said plurality of flanges and said plurality of retaining arms, wherein said engagement mechanisms cause said plurality of flanges and said plurality of retaining arms to become engaged; and a hinge on each of said plurality of retaining arms.

6. The spool of claim 5, wherein said plurality of retaining arms can pivot on said hinge.

7. The spool of claim 6, wherein said plurality of retaining arms can pivot up to approximately ninety degrees.

8. The spool of claim 5, wherein said hinge comprises a V-shaped groove.

9. The spool of claim 5, further comprising a plurality of recess portions on a bottom surface of said annular portion of said bottom portion;

wherein said recess portions are configured such that a portion of a retaining arm can fit into said recesses.

10. A spool system comprising:

first and second spools comprising:

a barrel extending up from a bottom portion;

a ring extending from an outer circumferential surface of said barrel;

a plurality of flanges extending from said ring;

a plurality of retaining arms extending up from an annular portion of said bottom portion, the annular portion extending radially away from said outer circumferential surface of the barrel, wherein the plurality retaining arms and the plurality of flanges are disposed at corresponding radial positions of said barrel;

engagement mechanisms on at least one of said plurality of flanges and said plurality of retaining arms, wherein said engagement mechanisms cause said plurality of flanges and said plurality of retaining arms to become engaged;

a hinge on each of said plurality of retaining arms;

a plurality of recess portions on a bottom surface of said annular portion of said bottom portion;

wherein a portion of a retaining arm of said first spool fits into one of said recess portions of said second spool.

11. The spool system of claim 10, wherein an inner diameter of the bottom portion of said second spool is larger than an outer diameter of said barrel of said first spool.

* * * * *